United States Patent [19]

Yamamoto

[11] Patent Number: 4,485,411
[45] Date of Patent: Nov. 27, 1984

[54] SYSTEM FOR DELETING PICTURE INFORMATION

[75] Inventor: Kazuhiko Yamamoto, Yokosuka, Japan

[73] Assignee: Tokyo Shibaura Denki Kabushiki Kaisha, Kawasaki, Japan

[21] Appl. No.: 316,481

[22] Filed: Oct. 29, 1981

[30] Foreign Application Priority Data

Oct. 31, 1980 [JP] Japan .................................. 55-153273

[51] Int. Cl.³ ............................................. H04N 1/22
[52] U.S. Cl. ................................... 358/296; 358/301; 360/72.3; 364/518
[58] Field of Search ................ 358/296, 903, 102, 301; 360/14.2, 14.3, 72.3; 364/518, 519, 520, 521, 522, 523

[56] References Cited

U.S. PATENT DOCUMENTS

| | | | |
|---|---|---|---|
| 3,512,146 | 5/1970 | Smith et al. | 360/13 |
| 3,646,260 | 2/1972 | Bolger | 360/14.2 |
| 4,000,510 | 12/1976 | Cheney et al. | 360/33 |
| 4,041,463 | 8/1977 | Slutzky et al. | 364/900 |
| 4,130,842 | 12/1978 | Gallo et al. | 360/35 |
| 4,196,450 | 4/1980 | Miller et al. | 358/903 |
| 4,198,685 | 4/1980 | Corwin et al. | 364/900 |

FOREIGN PATENT DOCUMENTS 3036695 4/1981 Fed. Rep. of Germany .
2079793 10/1971 France .
2120298 7/1972 France .
2170510 8/1973 France .

OTHER PUBLICATIONS

R. Hunter et al., "International Digital Facsimile Coding Standards", Proceedings of the IEEE, vol. 68, No. 7, Jul. 1980, pp. 854–867.
"Systeme d'Impression a Laser", Journal of Optics, vol. 11, No. 1, Jan./Feb. 1980, p. 10, Paris, FR.
Herausgegeben von H. J. Siegert, "Virtuelle Maschinen", Berlin Heidelberg New York 1979, pp. 159–175.
Wolf, "Assoziative Speicher und Prozessoren", Elektronische Rechenanlagen 1975, H.6, pp. 264–271.

Primary Examiner—John C. Martin
Assistant Examiner—Edward L. Coles
Attorney, Agent, or Firm—Cushman, Darby & Cushman

[57] ABSTRACT

A system for deleting picture information is provided for a picture information file. The system has a keyboard, a 2-dimension scanning device, a magnetic tape device, a display device and a control device including a microprocessor. The deletion of the picture information recorded in the magnetic tape device is performed by recording the delete mark in a delete mark recording area of the retrieval title corresponding to the picture information to be deleted.

1 Claim, 14 Drawing Figures

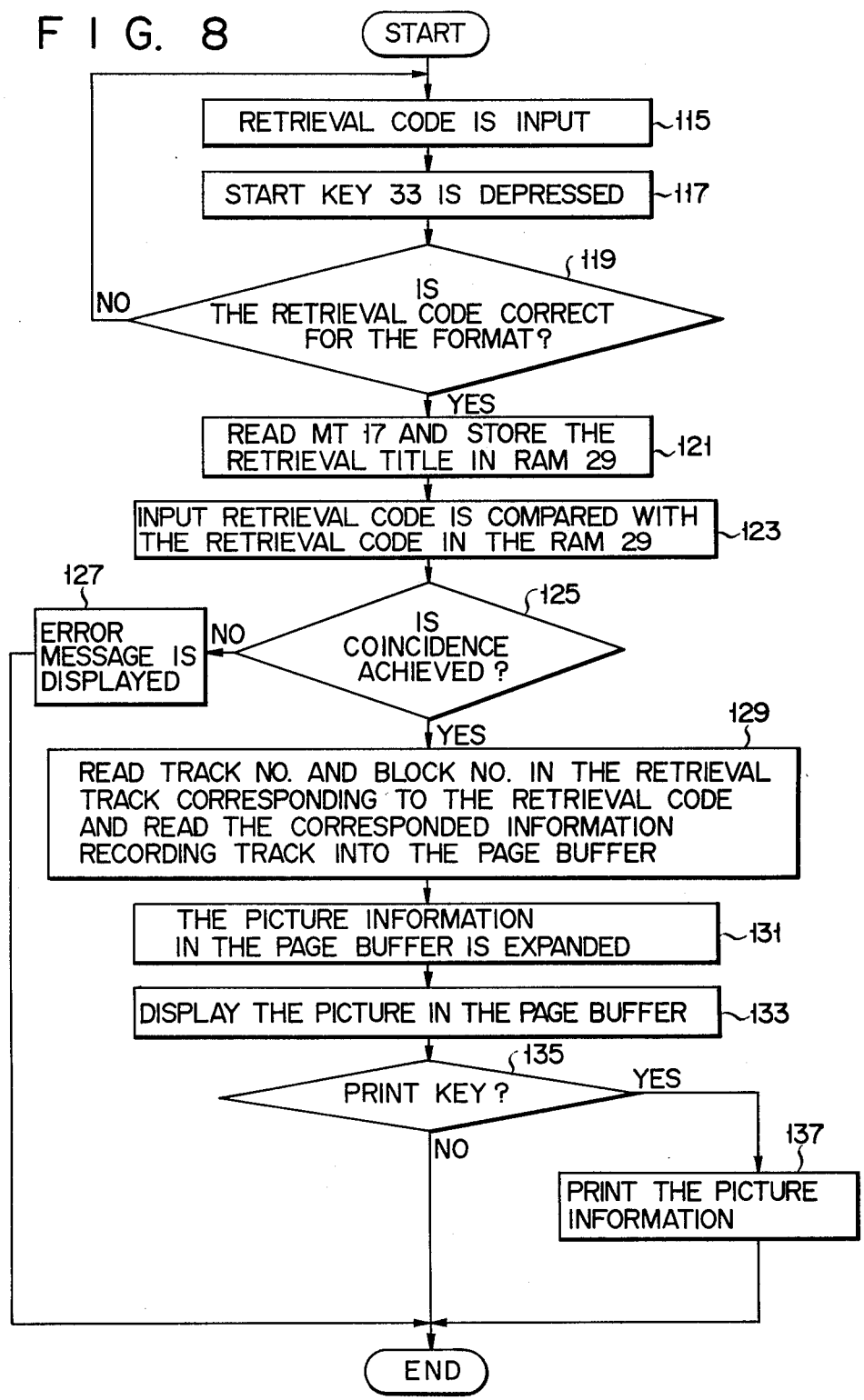

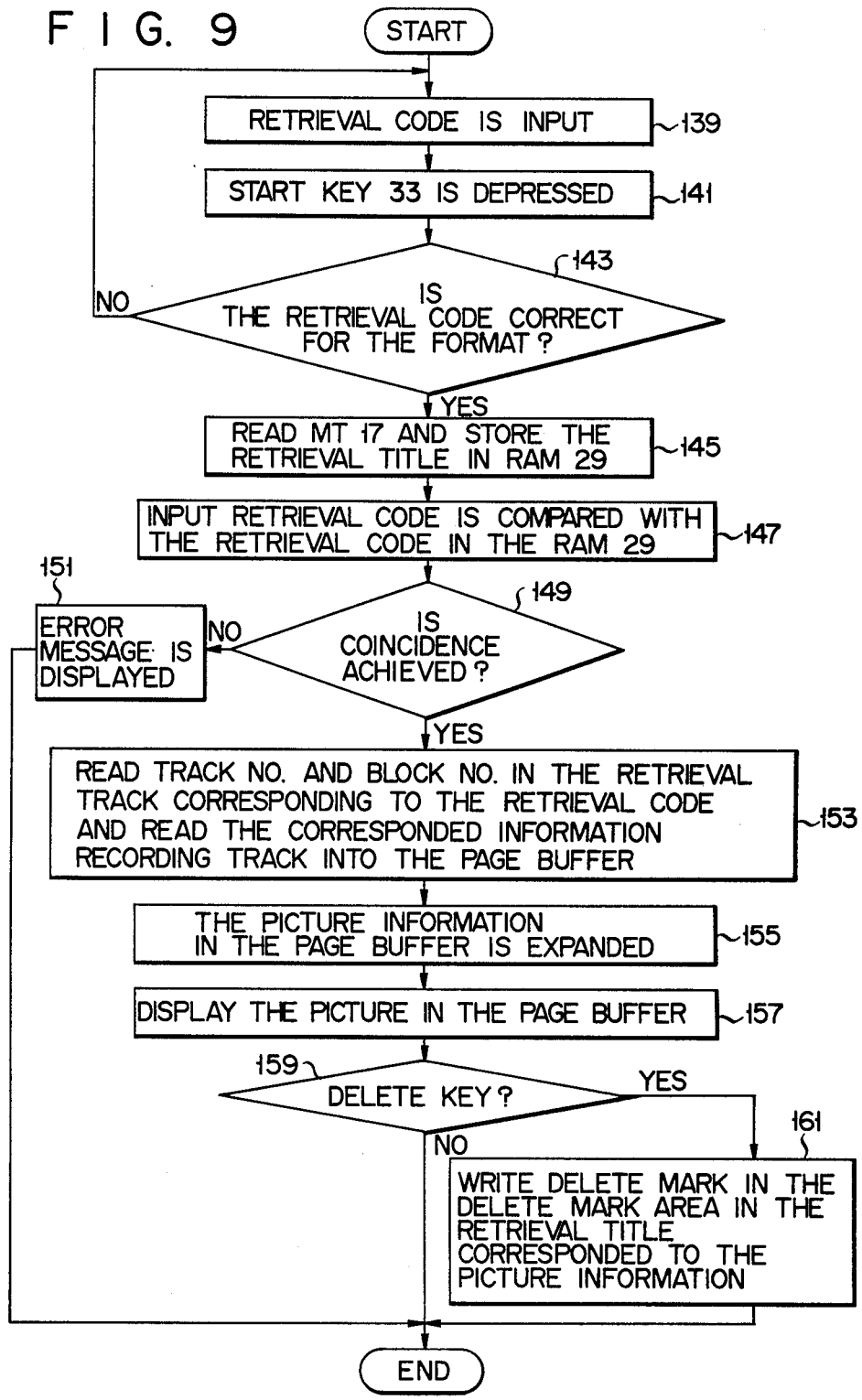

SYSTEM FOR DELETING PICTURE INFORMATION

BACKGROUND OF THE INVENTION

The present invention relates to a deleting system picture information in a picture information file device which is capable of recording picture information such as a document and which is capable of retrieving and outputting the recorded picture information as needed.

A conventional system for storing and retrieving a document picture is known wherein pictures reduced in scale are directly recorded on microfilms. As an improvement over this system, a picture information file device has been proposed which uses a 2-dimension scanning device utilizing photoelectric conversion techniques with a laser beam or CCD elements. This 2-dimension scanning device decomposes a document picture into picture elements, converts the picture elements into picture signals, and records the picture signals on a magnetic recording medium at a high density. This type of device also stores on the magnetic recording medium picture information and a retrieval title consisting of a retrieval code indicating a recording position of the picture information and so on. Therefore, as the need arises, the retrieval code may be input to retrieve the corresponding document picture as a hard copy.

However, with this type of device, the retrieval title and picture information must be deleted in order to delete the picture information recorded on a magnetic recording medium, resulting in inconvenience. Recording of new picture information in the deleted area also requires complex procedure.

SUMMARY OF THE INVENTION

It is an object of the present invention to provide a deleting system of picture information which eliminates the drawbacks of the conventional systems and which allows easy deletion of recorded picture information and recording of new picture information in place of the deleted picture information.

In order to achieve the above object, there is provided according to the present invention, a deleting system for variable length picture information in a picture information file device which stores picture information and a retrieval title including a retrieval code for retrieving the picture information, a track number and a block number, a recording area for recording the length of the picture information, and a delete mark representing that the picture information is deleted, and which outputs picture information corresponding to an input retrieval code, including:

(a) a control information input device comprising a keyboard having an abandon key for specifying abandonment of the picture information, a record key for specifying recording of the picture information, and a delete key for specifying deletion of the picture information;

(b) a 2-dimension scanning device which two-dimensionally scans the picture information for photoelectric conversion and outputs the photoelectrically converted picture information;

(c) a magnetic tape device for recording the photoelectrically converted picture information in an area represented by the track number and the block number on a magnetic tape;

(d) a display device for displaying picture information recorded or to be recorded by said magnetic tape device; and (e) a control device which has a programmable microprocessor connected to said control information input device, said 2-dimension scanning device, said magnetic tape device and said display device, and which includes a central processing unit for receiving input signals for controlling the recording, abandonment and deletion of the picture information, a read-only memory device for storing permanent programs, and a random access memory for storing data input by said control information input device, said read-only memory device storing the permanent programs having functions of said central processing unit so that said control device may perform specific functions according to the permanent programs;

wherein said control information input device, said 2-dimension scanning device, said display device and said magnetic tape device are so controlled that a delete mark is written in a delete mark recording area in the retrieval title for deleting the picture information recorded on the magnetic tape.

According to the present invention, a delete mark recording area is included in the retrieval title so that deletion of picture information may be performed by recording a delete mark in this delete mark recording area. Therefore, deletion of recorded picture information may be performed with ease, and new picture information may also be recorded in the deleted area with ease.

BRIEF DESCRIPTION OF THE DRAWINGS

Other objects and features of the present invention will be apparent from the following description taken in connection with the accompanying drawings, in which:

FIGS. 6A and 6B are views showing the recording formats of retrieval titles and picture information written in the tracks of the cassette tape shown in FIG. 5, wherein FIG. 6A shows the recording format of the retrieval titles and FIG. 6B shows the recording format of the picture information;

FIG. 8 is a flow chart showing the control operation of the main control device for performing retrieval and reproduction of the registered picture information;

FIG. 9 is a flow chart showing the control operation of the main control device for deleting the registered picture information; and FIGS. 10 to 12 show modifications of the embodiment of the present invention shown in FIG. 3, wherein FIG. 10 is a block diagram of a system which uses a magnetic disk device in place of a magnetic tape device shown in FIG. 3, FIG. 11 is a block diagram of a system which stores control programs in a floppy disk in place of a ROM, and FIG. 12 is a block diagram showing a system which stores the control programs in a floppy disk in place of the ROM and which uses a magnetic disk device in place of the magnetic tape device.

DETAILED DESCRIPTION OF THE PREFERRED EMBODIMENTS

Figure 1:
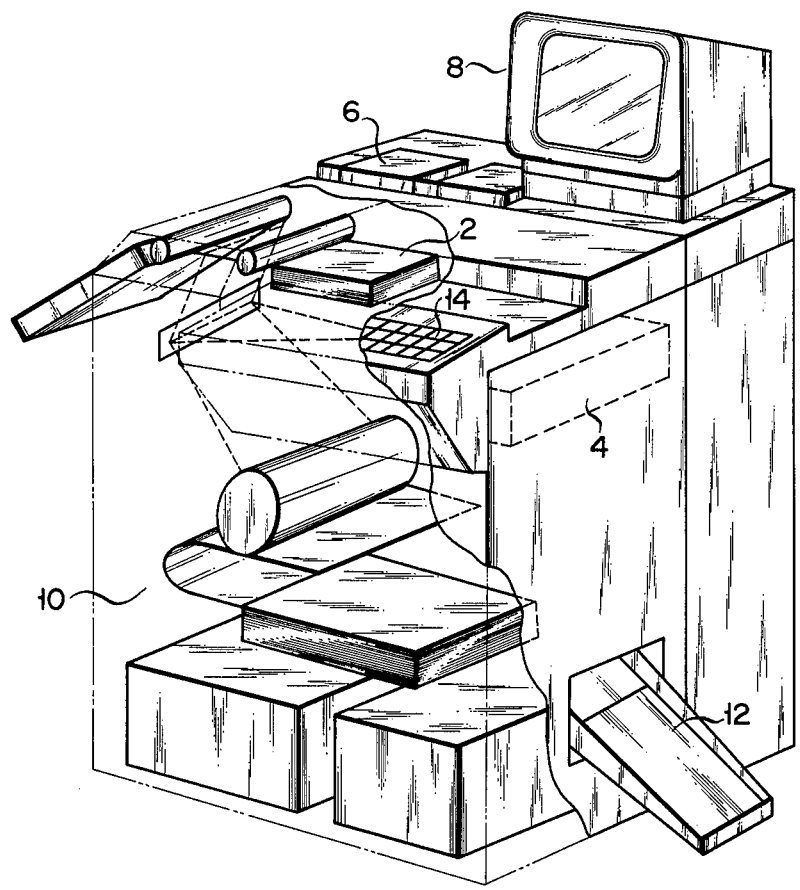
FIG. 1 is a schematic view of a picture information file device to which the recording system of picture information according to the present invention is applied.

FIG. 1 is a schematic view of a picture information file device to which the recording system of picture information of the present invention is applied. Referring to FIG. 1, when an original is set on an original table 2, the original is subjected to 2-dimensional scanning by a laser scanning system 4 for reading the picture information. The picture information is recorded on a magnetic tape 6. The picture information recorded on the magnetic tape 6 is retrieved according to a retrieval code input from a keyboard and displayed at a display device 8. If necessary, a hard copy 12 is prepared by an electrophotographic processing system 10.

Figure 2:
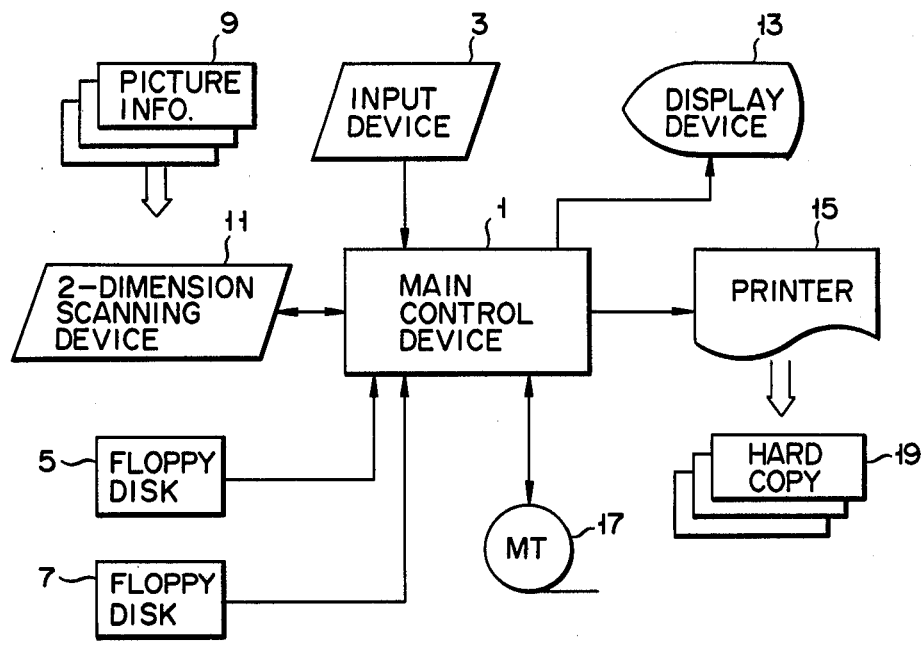
FIG. 2 is a block diagram showing an embodiment of the recording system of picture information of the present invention.

FIG. 2 is a block diagram showing the configuration of a system for storing and retrieving picture information according to the present invention. According to input information from an input device 3 (for example, a keyboard), a main control device 1 performs editing processes such as recording, reproduction, addition, insertion, deletion and so on of picture information and retrieval titles; and controls devices connected to this main control device 1. First and second floppy disks 5 and 7 store application programs, and the main control device 1 performs control according to these application programs.

Picture information 9 such as a document is photoelectrically converted by 2-dimensional scanning by a 2-dimension scanning device 11. The photoelectrically converted picture information (video signal) is supplied through the main control device 1 to a display device 13 such as a CRT display, and a printer 15 or a magnetic tape device 17. The 2-dimension scanning device 11 includes a switch (not shown) for controlling the binary encoding level according to the density of the original. The display device 13 displays the retrieval title from the keyboard 3, and the picture information from the 2-dimension scanning device 11 or from the magnetic tape device 17. The printer 15 receives the picture information from the 2-dimension scanning device 11 or from the magnetic tape device 17 and forms a 2-dimensional visible image, which is output as a hard copy 19.

Figure 3:
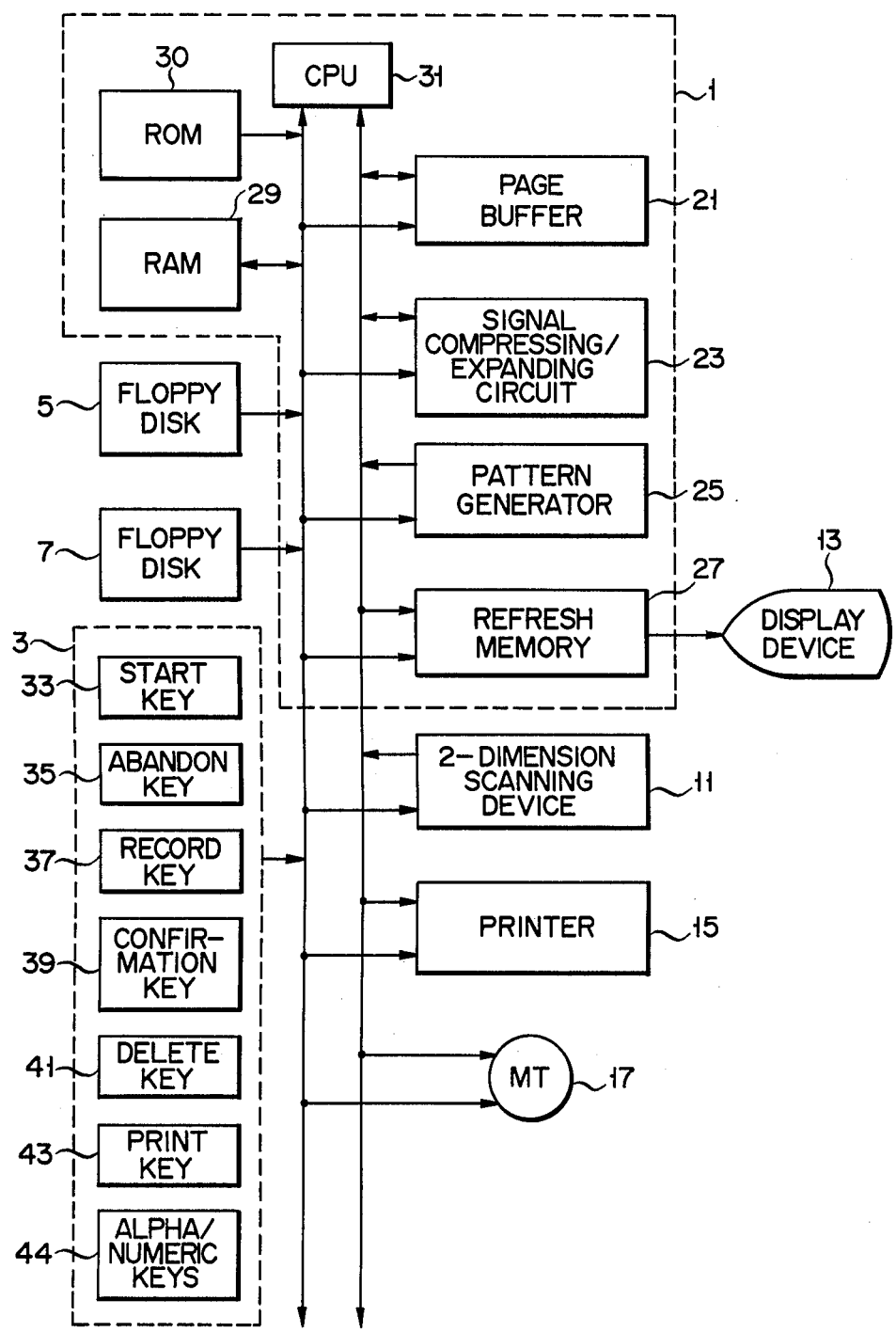
FIG. 3 is a detailed block diagram showing a main control device and an input device shown in FIG. 2.

FIG. 3 is a block diagram showing in detail the main control device and the input device shown in FIG. 2. The main control device 1 comprises a page buffer 21 for storing the picture information in units of pages, a signal compressing/expanding circuit 23 for performing signal compression and expansion by the MH (modified Hoffman) conversion or the MH inverse conversion, a pattern generator 25 for generating a character pattern, a refresh memory 27 for storing information to be displayed at the display device 13, a random access memory (RAM) 29 having a capacity sufficient to store the retrieval titles corresponding to one magnetic tape to be described later, and a central processing unit (CPU) 31 for controlling these circuits. An 8-bit microprocessor 8085 available from Intel. Corp., U.S.A. may be adopted as the CPU 31. A read-only memory (ROM) device 30 is externally connected to the CPU 13 and stores control programs to control the devices described above according to the registering mode, the retrieval mode, and the deletion mode of picture information.

The input device (keyboard) 3 includes a start key 33 which is depressed for storing a retrieval title or for setting the original, an abandon key 35 which is depressed for abandoning the picture information stored in the page buffer 21, a record key 37 which is depressed for recording the picture information stored in the page buffer 21 on a magnetic tape to be described later, a confirmation key 39 which is depressed when the picture information recorded on the magnetic tape is satisfactory, a delete key 41 which is depressed for deleting the picture information stored on the magnetic tape, a print key 43 which is depressed when the hard copy 19 of the picture information stored in the page buffer 21 is necessary, and alpha/numeric keys 44 for numerals 0 to 9 and for letters of the alphabet.

Figure 4:
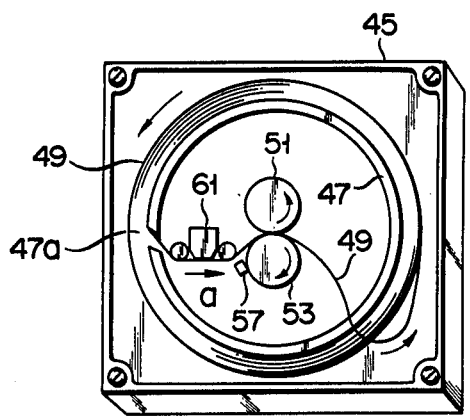
FIG. 4 is a view schematically showing a cassette tape of a magnetic tape device and a tape feed mechanism shown in FIGS. 2 and 3.
Figure 5:
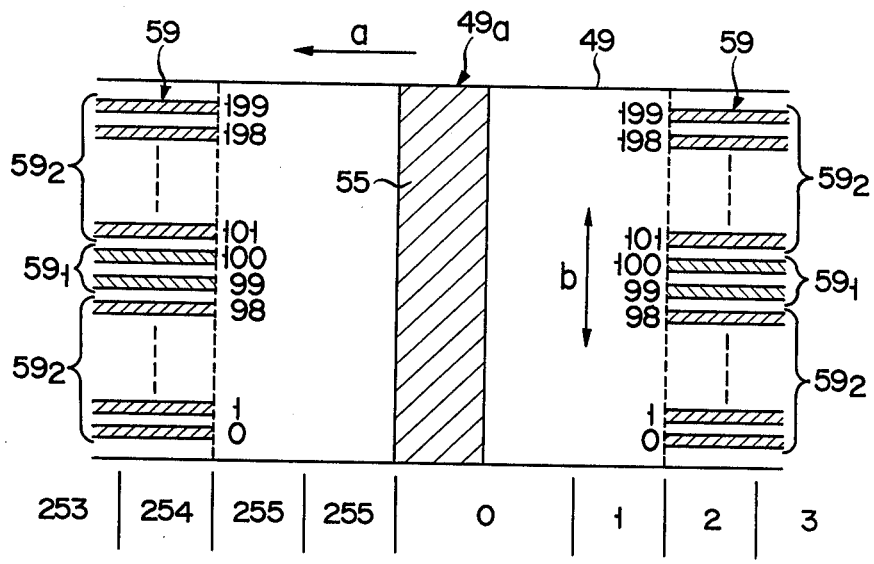
FIG. 5 is a view showing the configuration of tracks of the cassette tape shown in FIG. 4.

FIG. 4 is a schematic view showing a cassette tape and a feed mechanism of the magnetic tape device 17. Inside a casing 45 is disposed a stationary reel 47 which does not rotate and around which is wound magnetic tape 49 of, for example, ½ inch width (about 12.7 mm) and about 36 m length. When the cassette tape of this construction is mounted, the innermost turn of the tape is guided outside through a window 47a formed in the reel 47, is fed at high speed (about 5 m/sec) in the direction shown by arrow a in the figure by a capstan 51 and a pinch roller 53, and is then wound around the outermost turn of the tape 49. Therefore, the tape 49 completes one course in about 7.2 seconds. This one travel of the tape is confirmed by optically detecting at a mark detector 57 a tape mark 55 such as a silver paper chip attached to a connecting part 49a of the tape 49 as shown in FIG. 5. The output from the detector 57 is used as a reference for detecting a block position (to be described later) on the tape 49. Thus, 200 recording tracks 59 (of about 40 μm width and about 52 μm pitch) are formed parallel to each other along the direction of arrow a on the tape 49 as shown in FIG. 5. Track numbers "0, 1, 2, ..., 198, 199" are sequentially assigned to the recording tracks 59 from the lowermost track. Two substantially central tracks (track numbers 99 and 100 of which track number 99 is auxiliary) define a recording track 59$_1$ which records an inherent retrieval title (consisting of the retrieval code and the recording address which, in turn, consists of the track number and the block number) corresponding to picture information of one unit; and the remaining 198 recording tracks (track numbers 0 to 98 and 101 to 199) define information recording tracks 59$_2$ for recording the picture information. Each recording track 59 is divided into 256 blocks in the longitudinal direction of the tape as shown in FIG. 5; each block is sequentially assigned block numbers "0, 1, 2, ..., 254, 255" starting from the tape mark 55. Recording and reproduction of information on the tape 49 is performed by selecting a desired recording track 59 by reciprocally moving, by a head access mechanism (not shown), a recording/reproducing head (2-gap magnetic head having the function of deletion) 61 disposed in the vicinity of the capstan 51 a certain distance in units of microns in a direction b perpendicular to the direction shown by the arrow a.

Figure 6A:
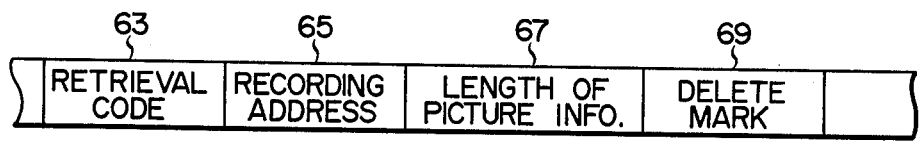
Figure 6B:
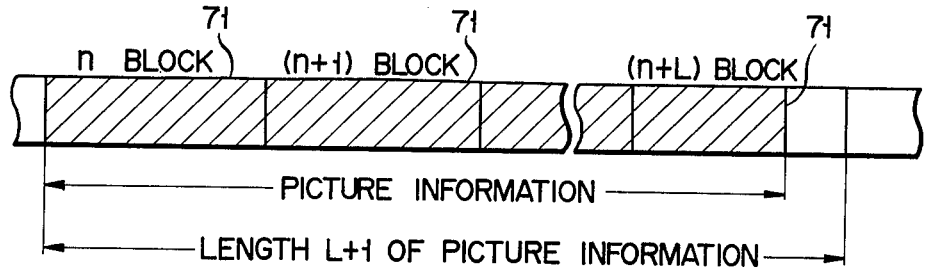

FIG. 6A shows the recording format of the respective retrieval titles on the retrieval title recording track 59$_1$. The retrieval titles are sequentially recorded in a retrieval code recording area 63 which records the retrieval code; a recording address recording area 65 which records recording addresses of a track number and a block number of the track which stores the picture information corresponding to this retrieval code; a length of picture information recording area 67 which records the length of the picture information, that is, how many blocks are involved in storing this picture information; and a delete mark recording area 69 which records a delete mark representing whether or not the picture information corresponding to the retrieval code is deleted. FIG. 6B shows the recording format of the picture information in the information recording track $59_2$, wherein picture information 71 is recorded on a plurality of blocks.

Figure 7A:
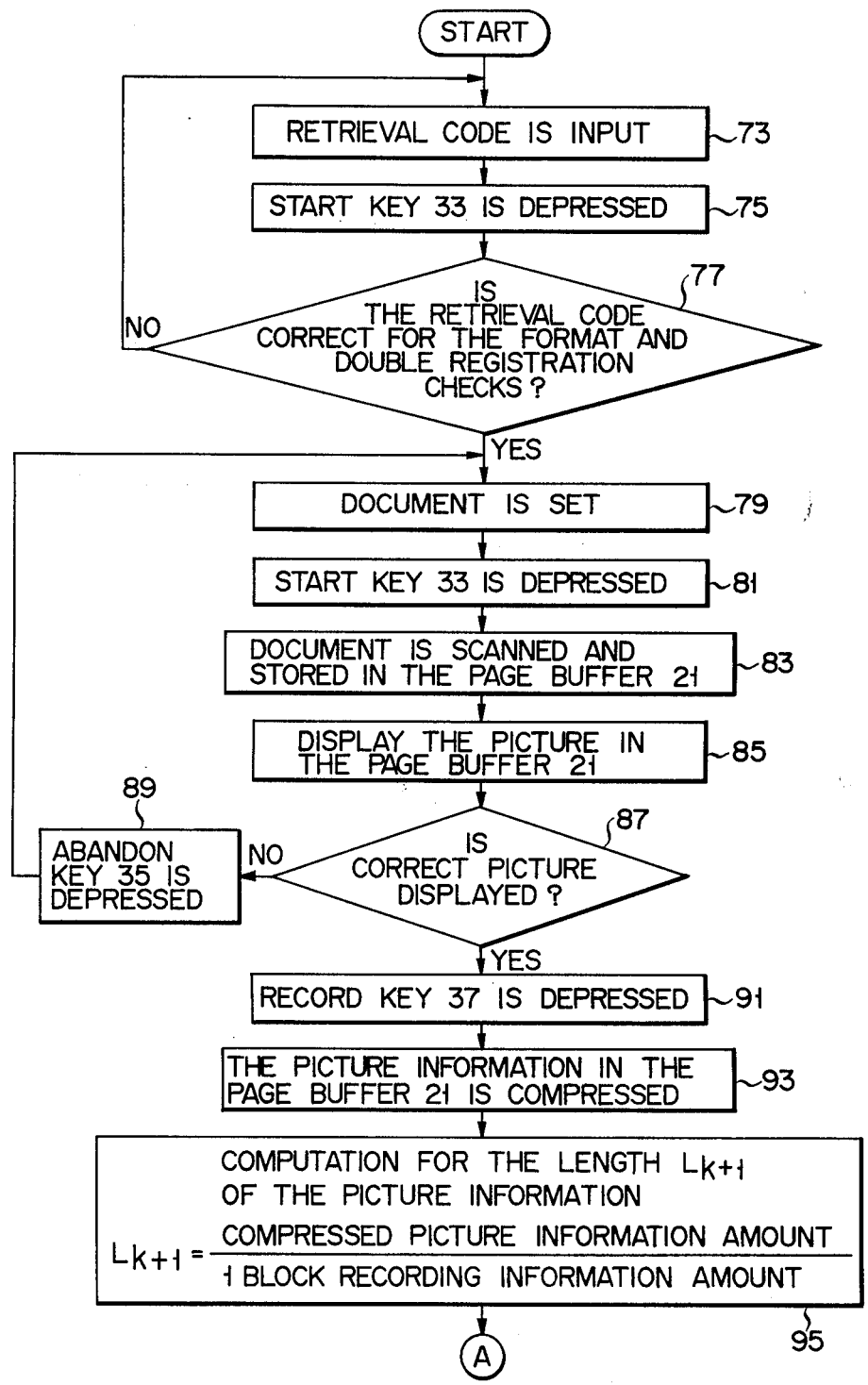
FIGS. 7A and 7B are flow charts showing the control operation of the main control device for performing registering of picture information.
Figure 7B:
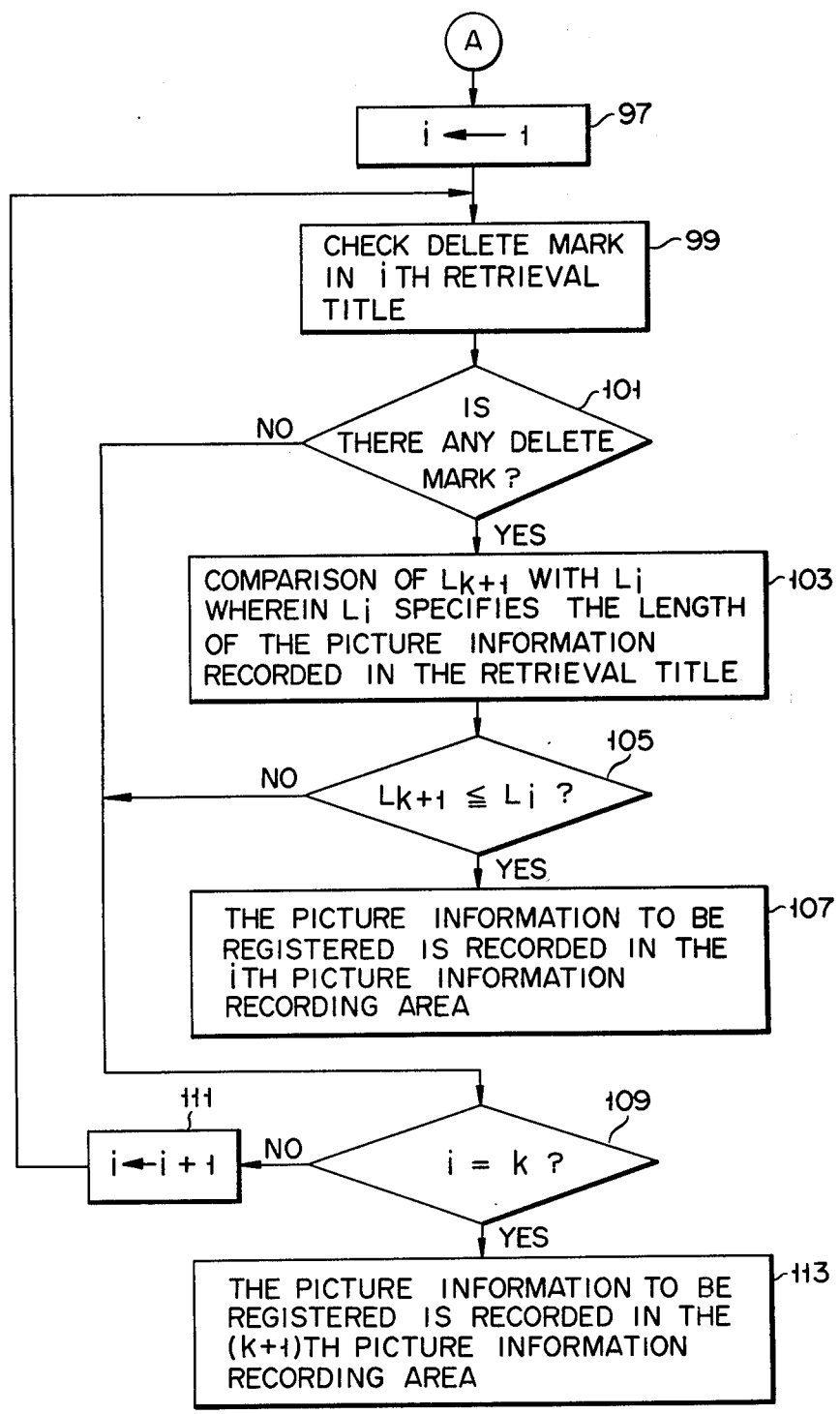

Registration of the picture information with a picture information file device adopting the deleting system of picture information according to the present invention will be described with the flow charts shown in FIGS. 7A and 7B. The flow charts shown in FIGS. 7A and 7B show the control operation for registering the (k+1)th section of picture information when k sections of picture information including deleted picture information are already registered on the magnetic tape 49.

The registering mode is first set from the keyboard 3. This may be accomplished by inputting "1" when, for example, the display device displays messages of "registering mode: 1", "retrieval mode: 2", and "deleting mode: 3". When the registering mode is set, the retrieval code of the picture information to be registered is input from the keyboard 3 in step 73, and in step 75, the start key 33 is depressed. Upon this operation, the CPU 31 performs, in step 77, checking of the input data such as checking of the number of digits, the kind of characters and so on according to the format of the retrieval code which is prepared in advance. The retrieval codes which are already registered are checked for double registration. If the retrieval code is the correct one, it is stored in the RAM 29. If the retrieval code is not the correct one, the program returns to step 73, and another retrieval code is input. In step 79, when the original is set by the operator for the 2-dimension scanning device 11 and, in step 81, the start key 33 is depressed, the CPU 31 operates the 2-dimension scanning device 11 and drives the magnetic tape 49. In step 83, the 2-dimension scanning device 11 performs 2-dimension scanning and photoelectric conversion of the picture information such as a document set in step 79. The line information which is photoelectrically converted is sequentially stored in the page buffer 21. When picture information corresponding to one page is stored in the page buffer 21, the picture information is stored in the refresh memory 27 and is displayed at the display device 13 in step 85.

In step 87, the operator checks on the display to determine if the original is set straight or bent, and if the density of the original matches with the binary encoding level of the 2-dimension scanning device 11. If the picture information is not satisfactory, the abandon key 35 is depressed. Then, the CPU 31 deletes the contents in the page buffer 21 and the refresh memory 27. If the original is not set straight or bent, the original is reset. If the density is improper, the binary encoding level of the 2-dimension scanning device 11 is adjusted. The program returns to step 79, the original is reset and the procedure as described above is performed again.

If the display on the display device 13 is satisfactory, the record key 37 is depressed in step 91. Then, in step 93, the CPU 31 band-compresses, at the signal compressing/expanding circuit 23 by the conventional MH (modified Hoffman) conversion, the picture information of one unit stored in the page buffer 21 one scanning line at a time. The compressed line information is stored again in the page buffer 21.

In step 95, the CPU 31 computes the length (block number) $L_{k+1}$ of the compressed picture information which is stored in the page buffer 21. This may be accomplished by dividing the amount of the compressed picture information by the amount of the recording information in one block. In step 97 to follow, a counter i is set to "1". In step 99, it is sequentially checked to determine if the delete mark is attached to each of the retrieval titles in the RAM 29. If it is judged in step 101 that the ith retrieval title has the delete mark, the length $L_i$ of the deleted picture information is compared in step 103 with the length $L_{k+1}$ of the new picture information to be registered. If it is judged in step 105 that the picture information to be registered is shorter than or equal to the deleted picture information, the CPU 31, in step 107, updates the old retrieval title in the RAM 29 to the retrieval title consisting of the retrieval code of the new picture information and deletes the delete mark. The CPU 31 initiates the travel of the magnetic tape 49 and moves the head to the corresponding information recording track $59_2$. The CPU 31 thus records the compressed picture information stored in the page buffer 21 starting from a predetermined block. If it is judged in step 105 that the deleted picture information is longer than or equal to the picture information to be registered, it is judged in step 109, whether the content of the counter i is k, that is, if the recorded retrieval titles have been checked to the last one. If it is judged that this checking has not been completed, the counter i is incremented in step 111 and the program returns to step 99. The CPU 31 then checks if the delete mark is attached to the next code in the RAM 29. If there is a retrieval title to which the delete mark is attached, the same operation as described above and the recording of the new picture information are performed.

If, in step 101, there is no retrieval title to which the delete mark is attached and, in step 109, the content of the counter i is k, that is, the retrieval titles are checked to the last one, the new picture information is recorded in the (k+1)th picture information recording area.

The retrieval and reproduction of the picture information registered in this manner will now be described with reference to the flow chart shown in FIG. 8. The retrieval mode is set from the keyboard 3. In this embodiment, the retrieval mode is set by inputting "2" as was described earlier. When the retrieval mode is set, the retrieval code is first input in step 115. In step 117, the start key 33 is depressed. Then, the CPU 31 checks the input data such as the number of digits, the kind of characters and so on according to the format of the retrieval code which is prepared in advance. Since this checking procedure is the same as in step 77 described with reference to FIG. 7A, the description thereof will be omitted. When the correct retrieval code is input, the CPU 31 initiates in step 121, the travel of the magnetic tape 49 and moves the head 61 to the retrieval title recording track $59_1$ to start reproduction from this track. Then, all the reproduced retrieval titles, that is, the retrieval codes and the recording address representing the track numbers and the initiating blocking numbers of the corresponding picture information, are stored in the RAM 29. In step 123, the CPU 31 sequentially compares the retrieval codes of the retrieval titles stored in the RAM 29 with the input retrieval code. If, in step 125, there is no retrieval code which coincides with the input retrieval code, an error display is performed in step 127 indicating that retrieval is impossible and the retrieval operation is terminated. When there is a retrieval code which coincides with the input retrieval code, in step 129, the track number and the block number of the coincident retrieval code are retrieved from the retrieval title which is stored in the RAM 29. The CPU 31 moves the head 61 to the information recording track $59_2$ corresponding to the track number thus obtained, reads the picture information at this track, and stores the picture information in the page buffer 21. Thereafter, in step 131, the picture information for one scanning line at a time is subjected to band compression by MH inverse conversion at the signal compressing/expanding circuit 23 to return it to the original picture information, and the picture information is stored in the page buffer 21. When all the reproduced picture information for one page is stored in the page buffer 21, the CPU 31 supplies in step 133, the picture information to the refresh memory 27 and displays it at the display device 13. When the operator judges that the picture information thus displayed is to be printed, the operator depresses the print key 43 in step 135. Then, the CPU 31 supplies the picture information stored in the page buffer 21 to the printer 15 which produces the hard copy 19 in step 137.

Hard copies 19 of the corresponding picture information are obtained by the same operation when other retrieval codes are input.

Deletion of the picture information registered in this manner will now be described with reference to the flow chart shown in FIG. 9. First, the deletion mode is set from the keyboard 3. In this embodiment, the deletion mode is set by inputting "3" as has been described earlier. When the deletion mode is set, the retrieval code is first input in step 139. In step 141, the start key 33 is depressed. Then, the CPU 31 checks the input data as to the number of digits, the kind of characters and so on according to the format of the retrieval code which is prepared in advance. Since this checking procedure is the same as the checking procedure described with reference to step 77 of FIG. 7A, the description thereof will be omitted. When the correct retrieval code is input, the CPU 31 initiates in step 145, the travel of the magnetic tape 49 and moves the head 61 to the retrieval title recording track $59_1$ to start reproducing the data on this track. Then, the length of the picture information (number of blocks), the delete mark, and all the reproduced retrieval titles, that is, the retrieval codes and the recording addresses representing the track numbers and the initiating block numbers of the corresponding picture information, are stored in the RAM 29. In step 147, the CPU 31 sequentially compares the retrieval codes of the retrieval titles stored in the RAM 29 with the input retrieval code. If it is judged in step 149 that there is no retrieval code coincident with the input retrieval code, an error display representing that retrieval is impossible is performed in step 151, and the retrieval operation is terminated. If the retrieval code coinciding with the input retrieval code is present, the track number and the block number assigned to this coicident retrieval code are retrieved from the retrieval title stored in the RAM 29 in step 153. The CPU 31 moves the head 61 to the information recording track $59_2$ corresponding to the track number, reads the picture information of this track, and stores the picture information in the page buffer 21. Thereafter, in step 155, the picture information is subjected one scanning line at a time to band compression by MH inverse conversion at the signal compressing/expanding circuit 23, is converted into the original picture information, and is stored in the page buffer 21. When all the picture information corresponding to one page is stored in the page buffer 21, the CPU 31 supplies the picture information to the refresh memory 27 and displays it at the display device 13 in step 157. If the operator judges, in step 159, that the displayed picture information is to be deleted, the delete key 41 is depressed. Then, the CPU 31 records, in step 161, the delete mark in the delete mark recording area 69 of the corresponding retrieval title in the RAM 29. In this manner, the picture information whose delete mark corresponds with the recorded retrieval title is deleted.

In summary, in the recording area of the picture information whose delete code corresponds to the retrieval title assigned thereto may be recorded picture information of shorter length.

Figure 10:
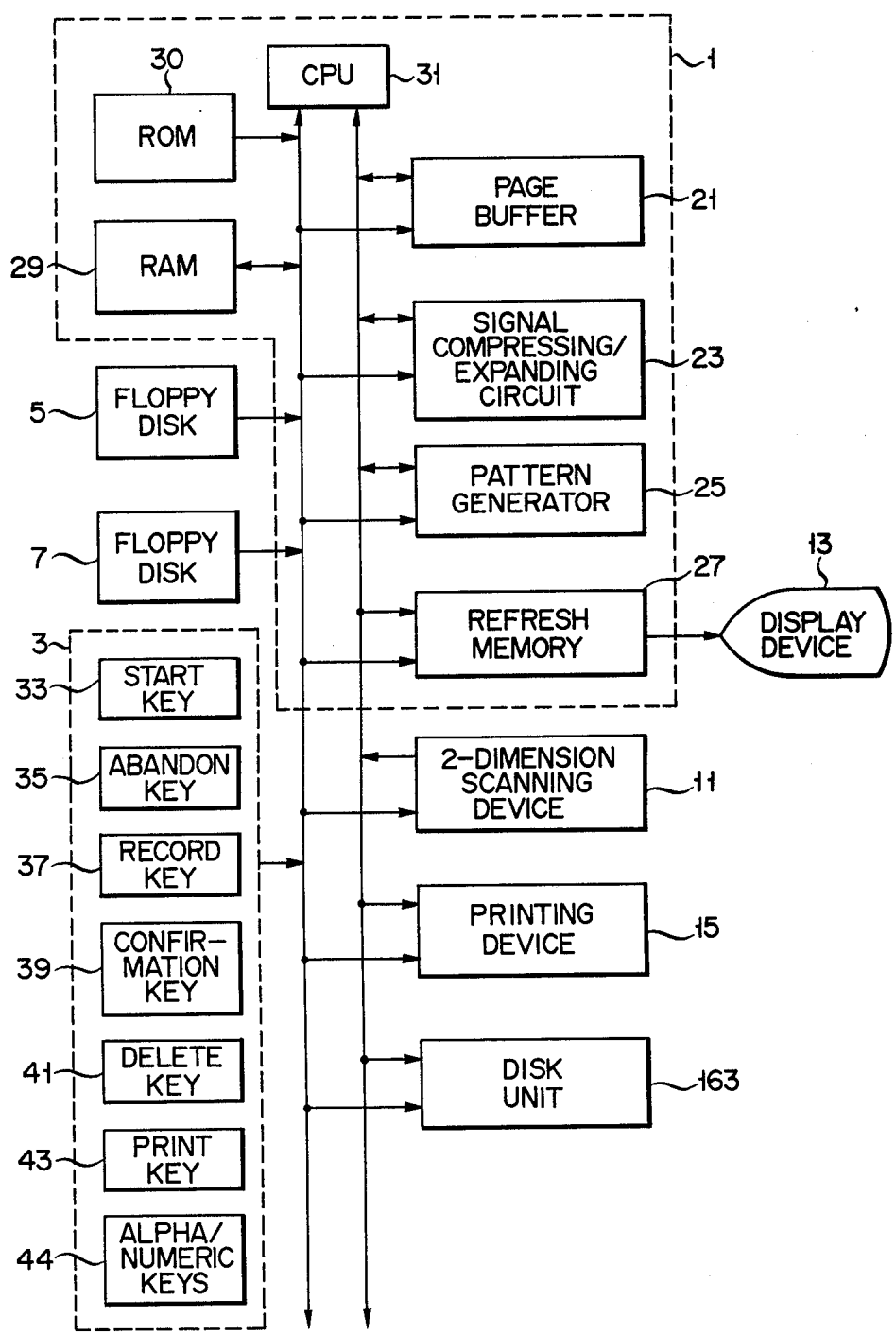

In the embodiment described above, the present invention has been described with reference to the case wherein picture information such as a document is recorded on or reproduced from a magnetic tape device in a picture information file device. However, the present invention is similarly applicable to a magnetic tape device which records or reproduces other kinds of information. Furthermore, the present invention has also been described with reference to the case of a magnetic tape device which uses an endless magnetic tape as the recording medium. However, the present invention may be similary applicable to other information recording devices such as a magnetic tape device which uses a general magnetic tape and not an endless magnetic tape, a magnetic disk device which uses a magnetic disk as a recording medium of the picture information as shown at 163 in FIG. 10, or an optical disk device which uses an optical disk as the recording medium.

Figure 11:
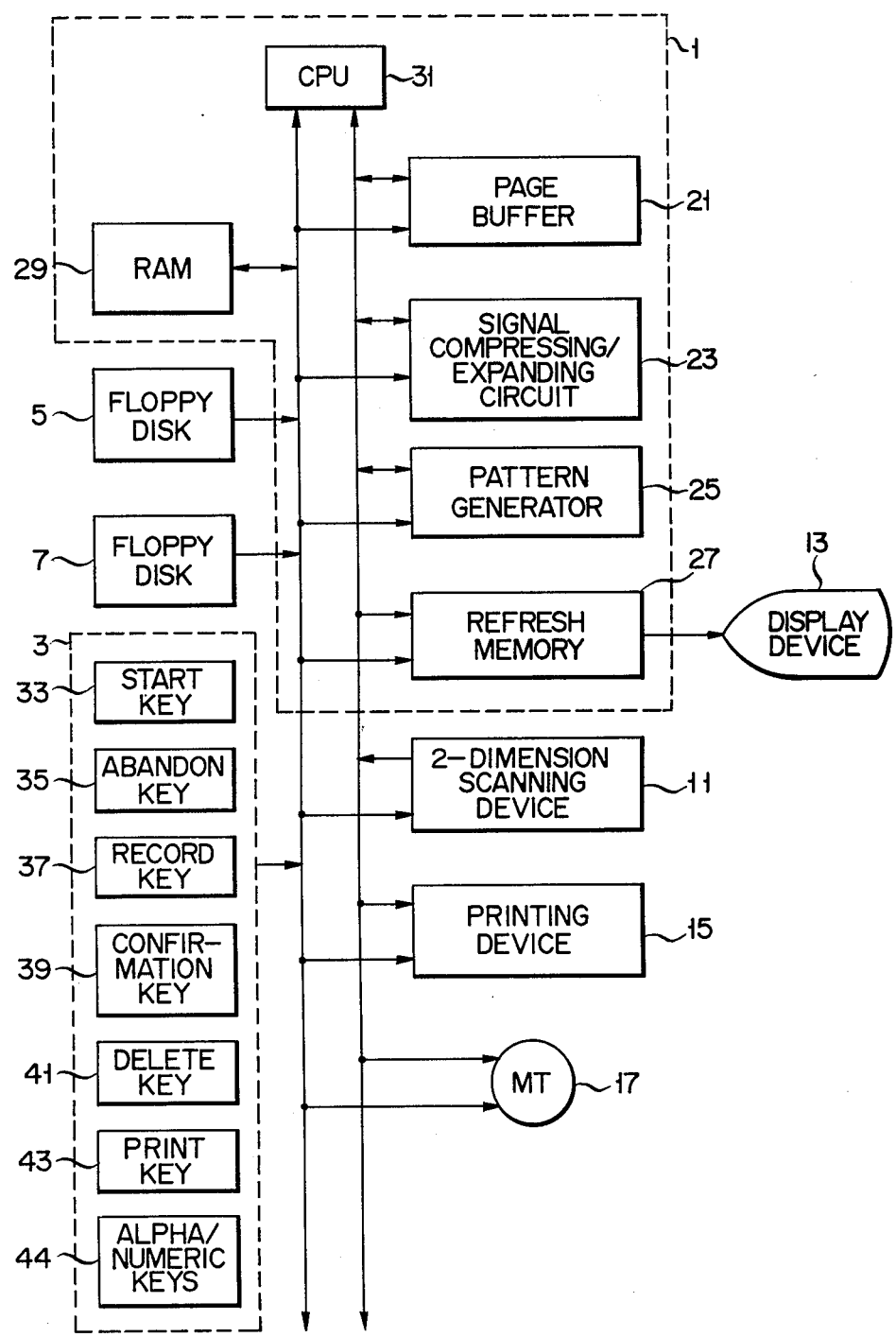
Figure 12:
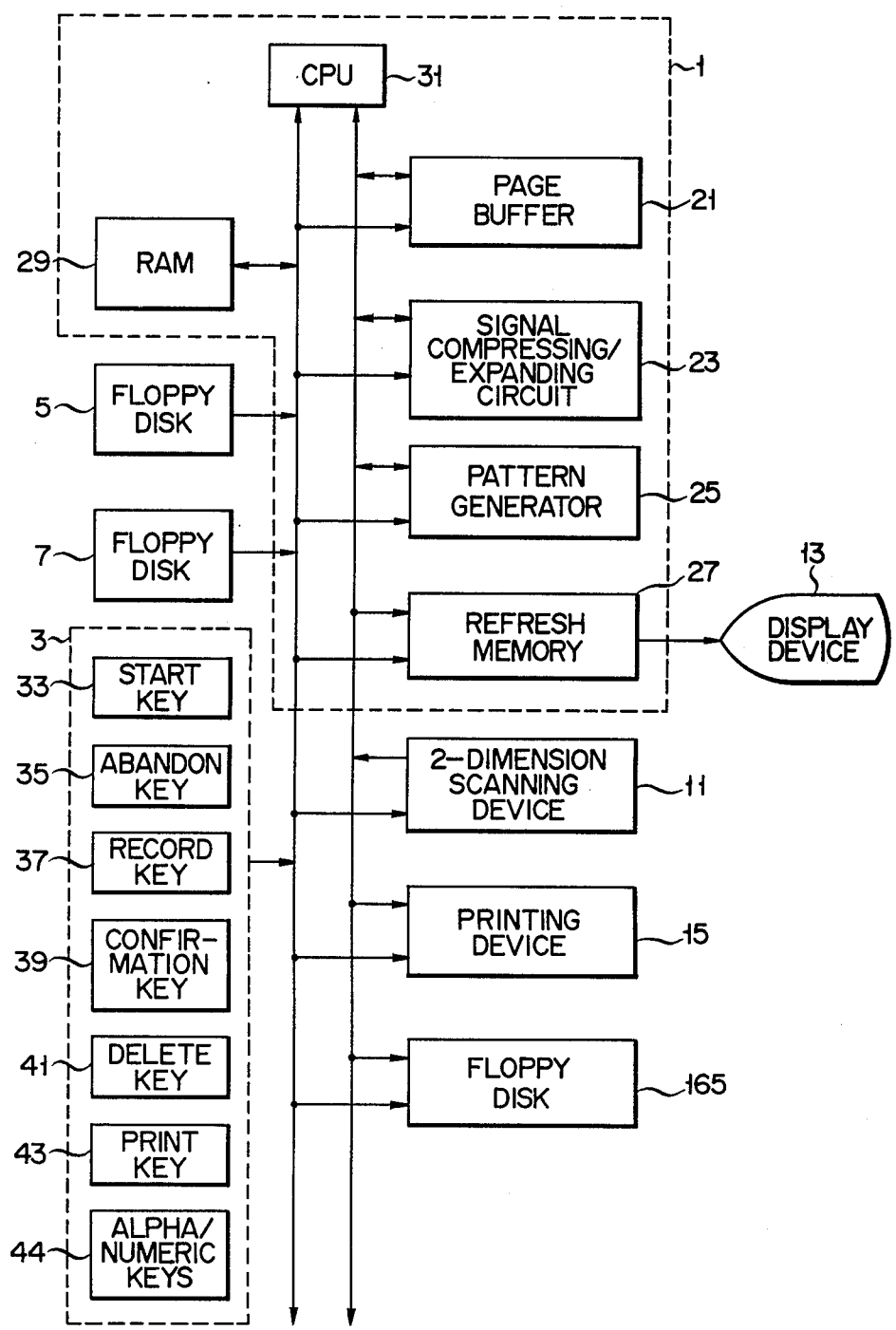

In the embodiment shown in FIG. 3, the control programs are stored in the read-only memory device 30. However, they may alternatively be stored on the floppy disks 5, 7 shown in FIG. 11. Still alternatively, a first floppy disk 5, 7 or a second floppy disk 165 may be incorporated as shown in FIG. 12. In this case, the first floppy disk 5, 7 may store the control programs and the second floppy disk 165 may store the picture information.

What is claimed is:

1. A picture information filing apparatus which stores picture information and a retrieval title, including a retrieval code for retrieving the picture information, and outputs picture information corresponding to an input retrieval code, comprising:
   scanning means for scanning picture information;
   buffer means for storing said scanning picture information;
   display means for displaying said picture information stored in said buffer means;
   a control information input device comprising a keyboard having a record key for specifying recording of said picture information and a deletion key for specifying deletion of recorded picture information;
   compandor means for compressing and expanding said picture information;
   external memory means having areas for recording said picture information and areas for recording the retrieval title including the retrieval code, the length of the picture information and a deletion mark representing that the picture information is deleted; and a microprocessor, responsive to said input device and connected to said external memory means, for recording said picture information in said external memory means in response to a signal from said record key and for deleting said picture information recorded in said external memory means by recording a deletion mark, in response to a signal from said deletion key, in said deletion mark recording area of said external memory means corresponding to said picture information to be deleted, said external memory means being external to said microprocessor.

* * * * *